(12) United States Patent
Inoue

(10) Patent No.: US 6,229,594 B1
(45) Date of Patent: *May 8, 2001

(54) PHOTOSENSITIVE MATERIAL SCAN-EXPOSURE METHOD AND PHOTOSENSITIVE MATERIAL EXPOSURE APPARATUS

(75) Inventor: Seiichi Inoue, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,069

(22) Filed: Mar. 30, 1998

(30) Foreign Application Priority Data

Mar. 31, 1997 (JP) .................................................. 9-081190

(51) Int. Cl.[7] .............................. G03B 27/48; G03B 27/52
(52) U.S. Cl. .................................................. 355/50; 355/40
(58) Field of Search ........................ 355/27–29, 40, 355/50; 358/257, 260

(56) References Cited

U.S. PATENT DOCUMENTS

| 4,694,352 | * | 9/1987 | Ina et al. ........................... 358/257 |
| 4,724,544 | * | 2/1988 | Matsumoto ........................ 382/27 |
| 4,968,997 | * | 11/1990 | Saitoh et al. ....................... 346/136 |
| 5,675,836 | * | 10/1997 | Matsumoto ........................ 396/564 |
| 5,684,568 | * | 11/1997 | Ishikawa et al. .................. 355/68 |
| 5,731,888 | * | 3/1998 | Arai ................................... 359/204 |
| 5,734,461 | * | 3/1998 | Ishikawa et al. .................. 355/40 |
| 5,889,537 | * | 3/1999 | Shimada ............................ 347/41 |
| 5,929,975 | * | 7/1999 | Matsumoto ........................ 355/46 |

FOREIGN PATENT DOCUMENTS 8-314022    11/1996   (JP) .

* cited by examiner

*Primary Examiner*—Russell Adams
*Assistant Examiner*—Henry Hung Nguyen
(74) *Attorney, Agent, or Firm*—Sughrue, Mion, Zinn, Macpeak & Seas, PLLC

(57) ABSTRACT

In a photosensitive material exposure apparatus in which a plurality of rows of photosensitive materials can be subjected to scan-exposure, in a case in which there is only one row of a photosensitive material, scanning is not wasted and exposure time is reduced. Images are exposed by a single scan exposure system in which the column direction of a photographic printing paper (P) is a main scanning direction and a direction orthogonal to the column direction is a sub-scanning direction. In case of single row exposure, scan-exposure is effected only on a necessary row. Accordingly, exposure time can be reduced.

24 Claims, 5 Drawing Sheets

F I G. 4A
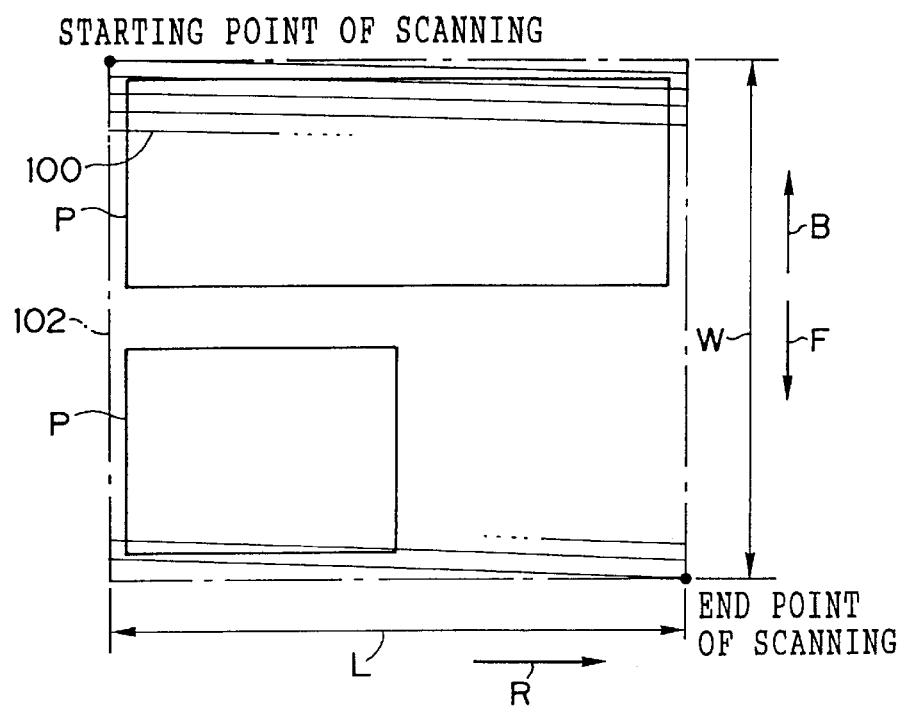
F I G. 4B
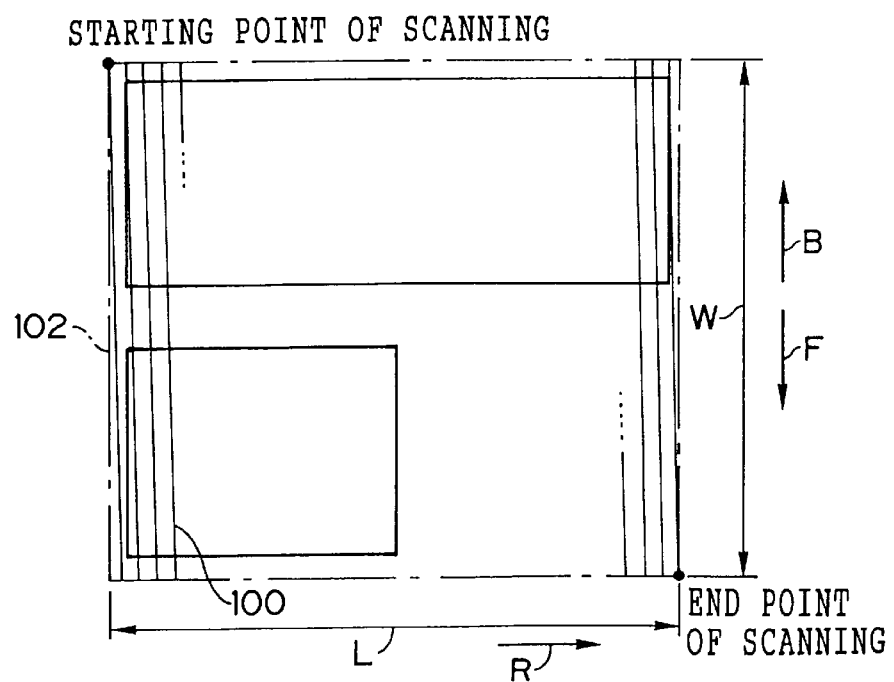

PHOTOSENSITIVE MATERIAL SCAN-EXPOSURE METHOD AND PHOTOSENSITIVE MATERIAL EXPOSURE APPARATUS

BACKGROUND OF THE INVENTION

1. Field of the Invention

The present invention relates to a photosensitive material scan-exposure method and a photosensitive material exposure apparatus, and is applicable to, for example, a photographic printer.

2. Description of the Related Art

An exposure apparatus in which images are printed onto a photosensitive material such as a photographic printing paper includes, for example, an exposure apparatus in which exposure is effected by main scanning and sub-scanning.

In this exposure apparatus, exposure is carried out while a plurality of rows of photosensitive materials are conveyed. Main scanning is effected by a print head in which optical shutters are arranged in one dimension, i.e., the column direction and the vertical direction of a photosensitive material. Sub-scanning is effected in the conveying direction of the photosensitive material.

For example, in a case in which two rows of photosensitive materials are subjected to scan-exposure, the direction which runs along the column direction is the sub-scanning direction and the direction which is orthogonal to the sub-scanning direction is the main scanning direction. Accordingly, locus 100 of scanning beams is illustrated as shown in FIG. 4B. An area (W×L) which is surrounded by a dashed line in FIG. 4B denotes an image forming area 102. In FIG. 4B, a part of the locus 100 is unillustrated.

In the exposure apparatus, it is efficient to expose a plurality of photographic printing papers P. However, there are following drawbacks: (a) since a plurality of images are disposed in a row in the main scanning direction, it is necessary to rearrange the image data before exposure (e.g., in a case in which there are two images A and B, the information on the image A and the information on the image B are read for every one line of the main scanning and the image information is handled alternately (A, B, A, B . . . ); (b) since the sub-scanning direction is generally longer than the main scanning direction (the length of a photographic printing paper P in the transverse direction is generally longer), the response time of a linear image display element such as an LCD is slow and it is difficult to decrease the exposure time; (c) the time in which the single row is subjected to exposure is the same as the time in which a plurality of rows are subjected to exposure (as shown in FIG. 5B, even if the photographic printing paper P is disposed at only one row, a plurality of rows are subjected to main scanning. Consequently, it is a waste of time that the rows without photographic printing paper P are subjected to main scanning.).

SUMMARY OF THE INVENTION

With the aforementioned in view, an object of the present invention is to provide a photosensitive material scan-exposure method and a photosensitive material exposure apparatus which can solve the above-described drawbacks.

A first aspect of the present invention is a photosensitive material scan-exposure method in which a plurality of photosensitive materials are disposed in a row and images are formed on the photosensitive materials by a single scan-exposure system, wherein: the column direction of the plurality of photosensitive materials is a main scanning direction and the direction orthogonal to the column direction is a sub-scanning direction.

The images are exposed onto the plurality of photosensitive materials disposed in a row by the single scan-exposure system in which the column direction of the photosensitive materials is the main scanning direction and the direction orthogonal to the column direction is the sub-scanning direction.

Because the plurality of images are disposed in a row in the sub-scanning direction, it is not necessary to rearrange the image data and the circuits which handle the image data can be simplified. Since the long edge direction of the photographic printing paper or the like is the main scanning direction, the exposure time can be reduced even if the scan-exposure system uses a display element whose response time is slow. Further, in case of single row exposure, the exposure is effected only on a necessary row. Thus, the exposure time can be reduced.

Another important aspect of the present invention is a photosensitive material exposure apparatus, comprising: a photosensitive material supporting portion in which a plurality of photosensitive materials can be disposed in a row; and a scan-exposure system in which the column direction of the photosensitive materials is a main scanning direction, in which the direction orthogonal to the column direction is a sub-scanning direction, and in which images are subjected to main scan-exposure onto the photosensitive materials which are disposed on the photosensitive material supporting portion.

The plurality of photosensitive materials are disposed in a row on the photosensitive material supporting portion. In the scan-exposure system, while the column direction of the photosensitive materials which are disposed on the photosensitive material supporting portion is the main scanning direction and the direction orthogonal to the column direction is the sub-scanning direction, the images are subjected to scan-exposure.

Because the plurality of images are disposed in a row in the sub-scanning direction, it is not necessary to rearrange the image data and the circuits which handle the image data can be simplified. Since the long edge direction of the photographic printing paper or the like is the main scanning direction, the exposure time can be reduced even if the scan-exposure system uses a display element whose response time is slow. Further, in case of single row exposure, the exposure is effected only on the necessary row. Thus, the exposure time can be reduced.

In the above-described photosensitive material exposure apparatus, the scan-exposure system includes main scanning means, which effects exposure of one line of the image, and moving means, which moves the main scanning means in the sub-scanning direction.

In the above-described photosensitive material exposure apparatus, one line of the image is exposed by the main scanning means and the moving means carries out sub-scanning by moving the main scanning means in the sub-scanning direction.

BRIEF DESCRIPTION OF THE DRAWINGS

FIG. 4A is an explanatory view which explains a scan-exposure method of the present embodiment and shows the relationship between the locus of scanning beams and photographic printing papers (a plurality of rows).

FIG. 4B is an explanatory view which explains a scan-exposure method of the present embodiment and shows the relationship between the locus of scanning beams and photographic printing papers (a plurality of rows).

DESCRIPTION OF THE PREFERRED EMBODIMENTS

An embodiment of a photosensitive material exposure apparatus of the present invention will be explained in accordance with FIGS. 1 through 5B.

Figure 1:
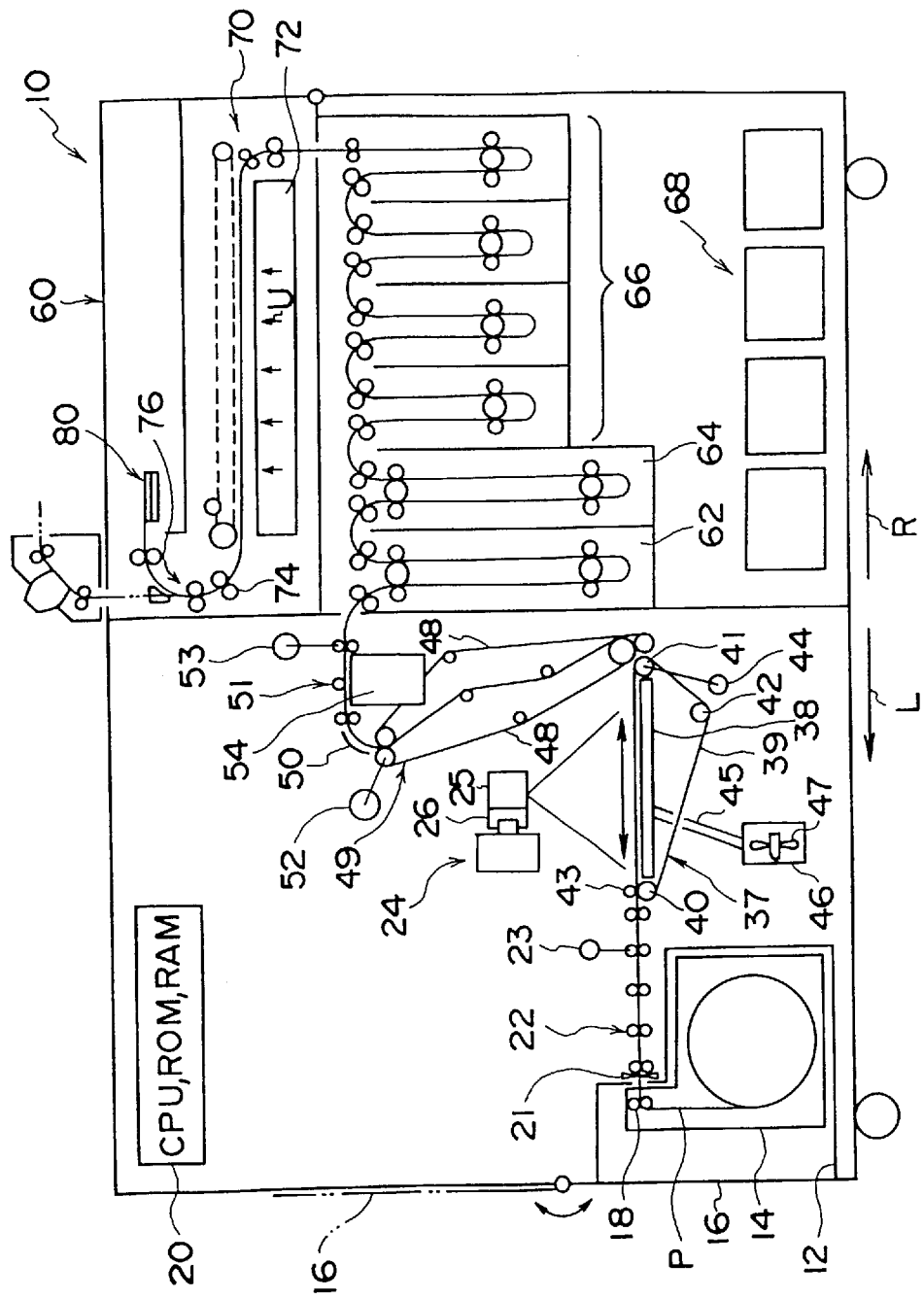
FIG. 1 is a structural view of a printer processor of a photosensitive material exposure apparatus to which an embodiment of the present invention is applied.

As shown in FIG. 1, a magazine accommodating portion 12 is provided within a printer processor 10 at the side in the direction of arrow L. A magazine 14 which accommodates a roll-shaped photographic printing paper P is loaded into the magazine accommodating portion 12. The magazine 14 can be replaced by opening a door 16 of the magazine accommodating portion 12.

In the printer processor 10, the two magazines 14 accommodating the photographic printing papers P can be disposed in a row and mounted.

A conveying roller pair 18, which conveys the photographic printing paper P out of the magazine 14, is provided in the vicinity of an exit of the photographic printing paper P. The conveying roller pair 18 receives driving force from a drive source (unillustrated) at the outer side of the magazine 14 so as to be rotated, and the photographic printing paper P is conveyed in the direction of arrow R. The drive source is provided so as to correspond to each of the magazines, and the operation of the drive source is controlled by a controller 20 (see FIG. 1) provided within the printer processor 10.

Accordingly, a plurality of photographic printing papers P can be conveyed in a row in the printer processor 10.

Figure 2:
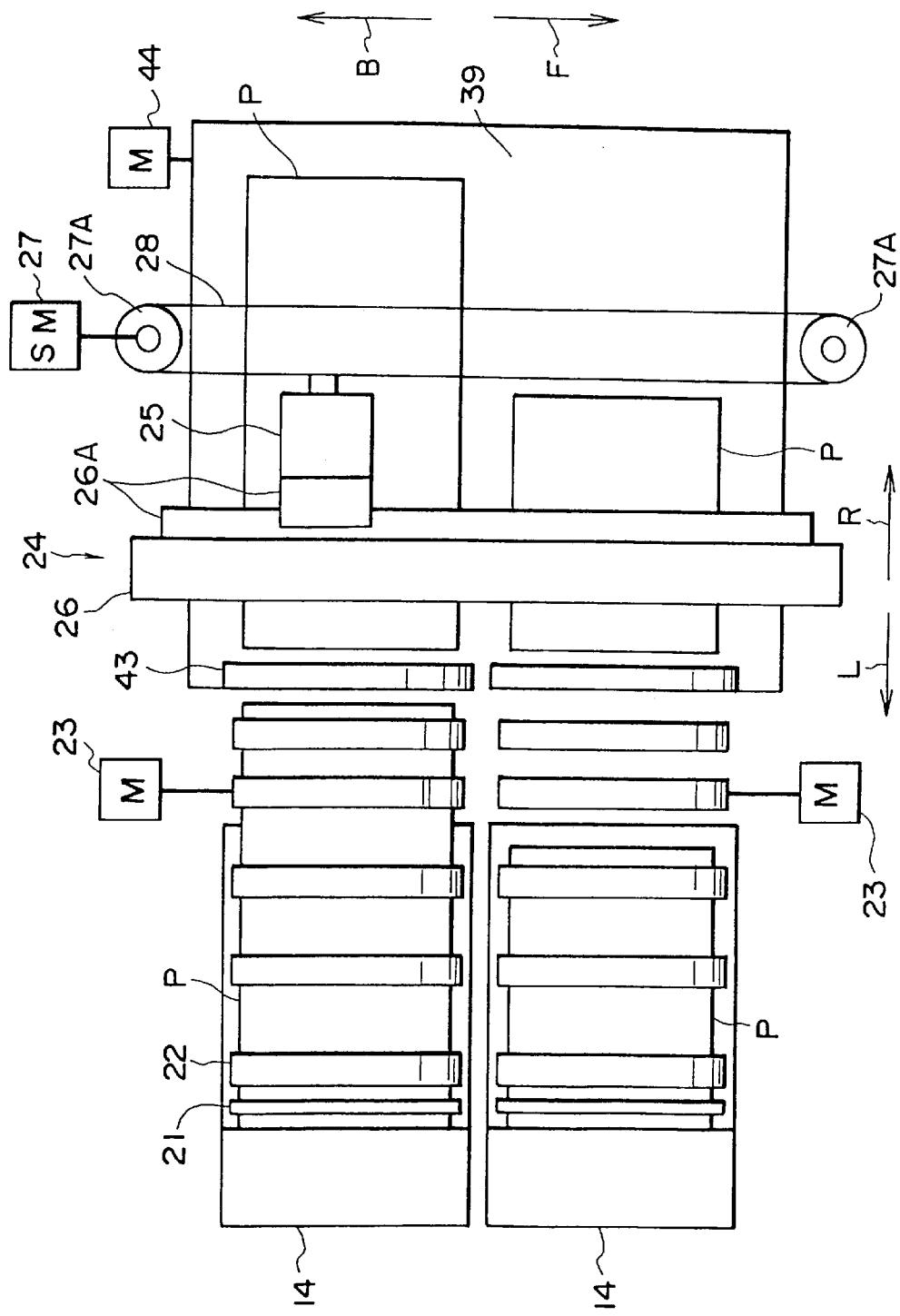
FIG. 2 is a plan view of a magazine and an exposure portion.

At the further downstream side in the conveying direction of the photographic printing paper P than the magazine 14, a cutter 21 which is long in the transverse direction (the direction of arrow F and the direction of arrow B in FIG. 2 of the photographic printing paper P is disposed. The cutter 21 can cut the photographic printing paper P in the transverse direction thereof, and the operation of the cutter 21 is controlled by the aforementioned controller 20.

At the further downstream side in the conveying direction of the photographic printing paper P than the cutter 21, a roller group 22 formed by a plurality of roller pairs is provided.

The roller group 22 is driven by a motor 23, and the operation of the motor 23 is controlled by the aforementioned controller 20.

At the further downstream side in the conveying direction of the photographic printing paper P than the roller group 22, an exposure portion 24 is provided. As shown in FIGS. 1 and 2, a frame 26, which extends in the direction orthogonal to the conveying direction (the direction of arrow R) of the photographic printing paper P, is disposed above the conveying path of the photographic printing paper P. A scan-exposure system 25 is a main scanning direction exposure means in which, when the column direction (the direction of arrow R in FIGS. 1 and 2) of the photographic printing paper P is the main scanning direction, scan-exposure is carried out in the main scanning direction. The scan-exposure system 25 is supported at the frame 26 via a linear guide 26A so that the scan-exposure system 25 can linearly move in the sub-scanning direction (the direction of arrow F in FIG. 2), which is the direction orthogonal to the column direction. The operation of the scan-exposure system 25 is controlled by the aforementioned controller 20.

As shown in FIG. 2, a timing belt 28, which is driven by a stepping motor 27 and a pulley 27A, is connected to the scan-exposure system 25, and these form moving means which moves the scan-exposure system 25 in the sub-scanning direction. The operation of the stepping motor 27 is controlled by the aforementioned controller 20 (unillustrated in FIG. 2).

Figure 3:
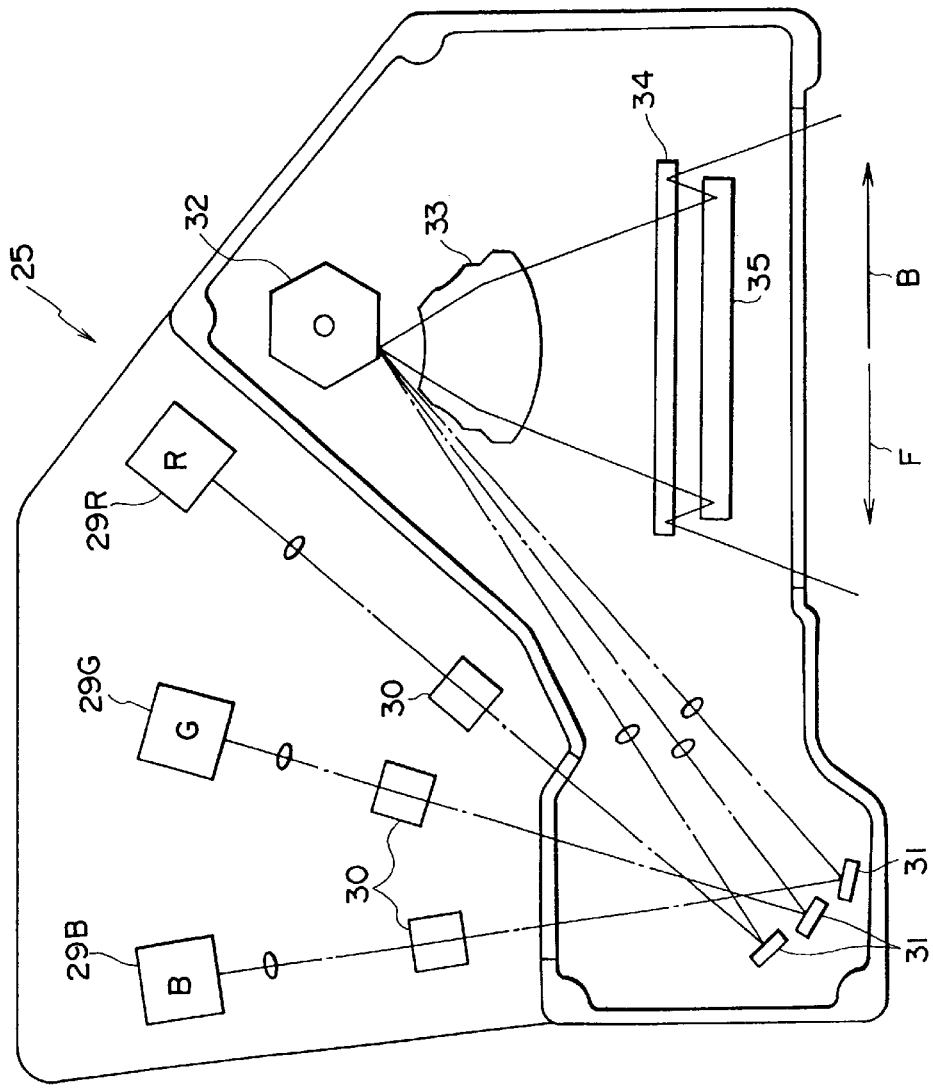
FIG. 3 is a structural view of a scan-exposure system.

As shown in FIG. 3, the scan-exposure system 25 has a well-known structure and includes an R(red) laser oscillator 29R, a G(green) laser oscillator 29G, a B(blue) laser oscillator 29B, a modulator 30, a mirror 31, a polygon mirror 32, an f-θ lens 33, mirrors 34, 35, and the like. These are provided for forming a color image on the photographic printing paper P. The operation of the scan-exposure system 25 is also controlled by the aforementioned controller 20 (unillustrated in FIG. 3). Instead of the polygon mirror 32, a galvanometer mirror may be used for performing main scanning of the laser beam.

As shown in FIG. 1, a suction/conveyance unit 37 is disposed beneath the scan-exposure system 25. The suction/conveyance unit 37 is provided with a supporting stand 38 whose upper surface is formed along a horizontal direction (the direction of arrow L and the direction of arrow R in FIG. 1). Training rollers 40, 41, 42, around which an endless belt 39 is trained, are respectively disposed in the direction of arrow L of the supporting stand 38, in the direction of arrow R thereof, and therebelow. A nip roller 43 is provided above the training roller 40 so that the endless belt 39 is nipped between the nip roller 43 and the training roller 40. The training roller 41 is rotated by a motor 44 whose operation is controlled by the controller 20.

A plurality of small holes (unillustrated) are formed over the entire area of the endless belt 39. A plurality of hole portions (unillustrated) are formed on the upper surface of the supporting stand 38, on which a portion of the endless belt 39 is loaded, so as to correspond to the small holes of the endless belt 39.

The inner portion of the supporting stand 38 is formed hollow and is connected to a fan box 46 via a communication duct 45. A fan 47 is attached to the fan box 46 so that the internal pressure thereof is turned into negative.

At the further downstream side in the conveying direction of the photographic printing paper P than the exposure portion 24, there is a belt conveying device 49 in which the photographic printing paper P is nipped between a pair of belts 48 and is conveyed upwardly. At the further downstream side in the conveying direction of the photographic printing paper P than the belt conveying device 49, there are a curved guide 50, which changes the conveying direction of the photographic printing paper P, and a roller group 51 formed by a plurality of roller pairs.

The belt conveying device 49 is driven by a motor 52 whose operation is controlled by the aforementioned controller 20, and the roller group 51 is driven by a motor 53 whose operation is controlled by the controller 20.

A printing device 54, which prints a frame number or the like on the reverse surface of the photographic printing paper P, is provided at the intermediate portion of the roller group 51. The operation of the printing device 54 is controlled by the aforementioned controller 20.

At the further downstream side in the conveying direction of the photographic printing paper P than the roller group 51, a processor section 60 is provided.

Developing solution is stored in a developing tank 62 of the processor section 60, and the photographic printing paper P is immerged in the developing solution so as to be subjected to development processing. The photographic printing paper P, which has been subjected to development processing, is conveyed to a bleach-fixing tank 64 which is adjacent to the developing tank 62. Bleach-fixing solution is stored in the bleach-fixing tank 64, the photographic printing paper P is immerged in the bleach-fixing solution so as to be subjected to bleaching processing and fixing processing. The photographic printing paper P, which has been subjected to fixing processing, is conveyed to a rinsing portion 66, which is adjacent to the bleach-fixing tank 64 and is formed by a plurality of rinsing tanks which store rinsing water. The photographic printing paper P is immerged in the rinsing water within the rinsing tanks so as to be subjected to rinsing processing. In the above-described developing tank 62, bleach-fixing tank 64, and the rinsing tanks of the rinsing portion 66, developer replenisher, bleach-fixer replenisher, and rinse replenisher are respectively supplied from a plurality of replenishing tanks 68 provided within the processor section 60. The solutions within the tanks are thereby replenished.

The photographic printing paper P, which has been subjected to rinsing processing, is conveyed to a drying portion 70 which is positioned above the rinsing portion 66. In the drying portion 70, the photographic printing paper P is subjected to hot air sent from a chamber 72, which is disposed below the conveying path of the photographic printing paper P, in the direction of arrow U. The photographic printing paper P is thereby dried.

At the further downstream side in the conveying direction of the photographic printing paper P than the drying portion 70, there is a conveying path 76 which is formed by a plurality of roller pairs 74. The photographic printing paper P, which has been subjected to drying processing and discharged from the drying portion 70, is nipped by the plurality of roller pairs 74 and discharged to a sorter 80 provided at the outer side of the printer processor 10.

Next, the operation of the present embodiment will be explained.

The conveying roller pair 18 of each of the magazines 14 is rotated in accordance with the size of a print to be exposed. The length of the photographic printing paper P is determined in accordance with the print size, and the photographic printing papers P are conveyed in a row from the respective magazines 14 to the exposure portion 24 side by the roller groups 22. At this time, the conveying roller pairs 18 at the magazines 14 start to convey the photographic printing papers P so that conveyance of both of the photographic printing papers P completes simultaneously.

When the predetermined length of photographic printing paper P is conveyed out of the magazine 14, the conveying roller 18 and the roller group 22 are stopped temporarily and the rear end of the photographic printing paper P is cut by the cutter 21.

When the photographic printing paper P is cut, the roller group 22 and the suction/conveyance unit 37 operate. When the two rows of photographic printing papers P are disposed at the exposure area of the suction/conveyance unit 37, the rotation of the roller group 22 and the movement of the endless belt 39 are stopped. At this time, since the internal pressure of the supporting stand 38 is turned negative due to the operation of the fan 47, the photographic printing paper P is sucked to the endless belt 39 and the planarity thereof is maintained.

The photographic printing paper P is subjected to scan-exposure by the laser beams irradiated from the scan-exposure system 25.

In the laser beams, due to the rotation of the polygon mirror 32, the main scanning takes place toward the direction of arrow R in the conveying direction of the photographic paper P, and due to the movement of the scan-exposure system 25, the sub-scanning takes place in the direction of arrow F. In this way, as shown in FIG. 4A, the first row of the photographic printing paper P and the second row thereof are successively exposed.

In the present embodiment, in FIG. 4A, scanning starts from the end portion of the image forming area 102 at the upper left side and ends at the end portion thereof at the lower right side. In FIG. 4, a part of the locus 100 is not shown.

In the present embodiment, the size of scanning is larger than that of the photographic printing paper P. Accordingly, even if the position of the photographic printing paper P is deviated a little, there is no unexposed portion (a white portion in a finished state) on the borders of the photographic printing paper P.

The exposed photographic printing paper P is conveyed to the processor section 60 by the belt conveying device 49 and the roller group 51 at low speed in accordance with the conveying speed of the processor section 60. Before the photographic printing paper P is conveyed to the processor section 60, the information such as frame number and the like can be recorded, as occasion demands, on the reverse surface of the photographic printing paper P by the printing device 54.

The two rows of photographic printing papers P conveyed to the processor section 60 are subjected to development, fixing, rinsing, and drying processings. Thereafter, the photographic printing papers P are discharged from the processor section 60 and dropped on the sorter 80.

In the printer processor 10 of the present embodiment, because a plurality of photographic printing papers P (images) are disposed in a row in the sub-scanning direction, it is not necessary to rearrange the image data before exposure. Compared to the conventional method in which the photographic printing papers are disposed in a row in the main scanning direction and subjected to scan-exposure, the structure of circuits in the controller 20 can be simplified.

Figure 5A:
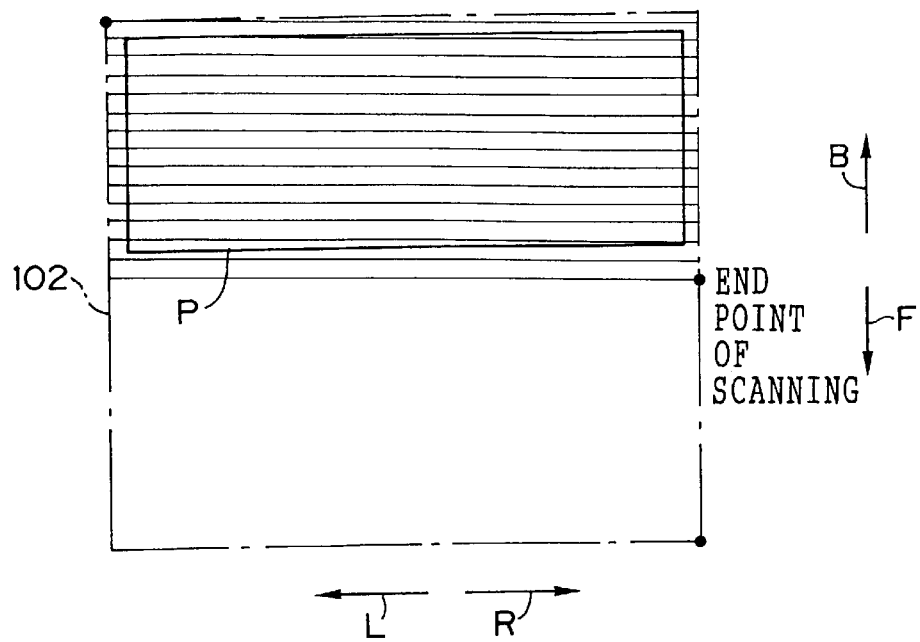
FIG. 5A is an explanatory view which explains a scan-exposure method of the present embodiment and shows the relationship between the locus of scanning beams and a photographic printing paper (a single row).
Figure 5B:
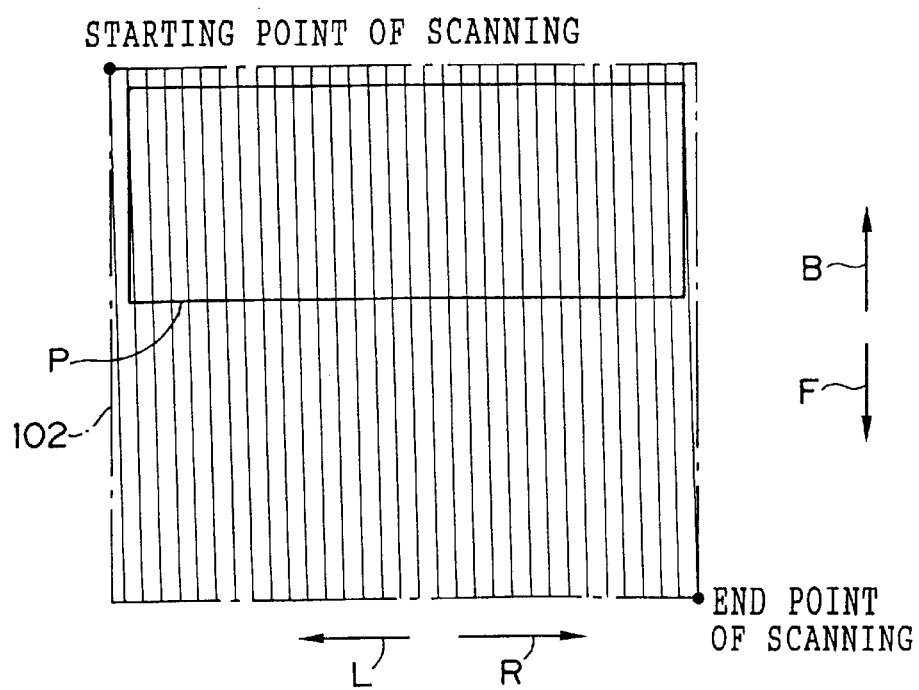
FIG. 5B is an explanatory view which explains a scan-exposure method of the present embodiment and shows the relationship between the locus of scanning beams and a photographic printing paper (a single row).

Further, in the present embodiment, an example is described of a case in which a plurality of rows of photographic printing papers P are exposed successively. However, as shown in FIG. 5A, only one row of the photographic printing paper P may be exposed. In this case, since scan-exposure takes place only on the necessary photographic printing paper P, the exposure time can be reduced.

In the present embodiment, the scan-exposure system 25, which is formed by the laser oscillators 29R, 29G, 29B, the modulator 30, the mirror 31, the polygon mirror 32, the f-θ lens 33, the mirrors 34, 35, and the like, is used for main scanning. However, a scan-exposure system having another structure may be used. The other scan-exposure system includes, e.g., CRT (cathode ray tube), PDP (plasma display), ELD (electroluminescent display), VFD (vacuum fluorescent display), LED (light emitting diode), LCD (liquid crystal display), ECD (electrochemical display), EPID (electrophoretic image display), SPD (suspended particle display), TBD (twisting ball display), PLZT (transparent ceramic display), DMD (digital micromirror device), and the like. The other scan-exposure system may be used provided that the system can carry out linear main scanning.

In the above-described embodiment, an example is described of a case in which the photographic printing papers P are conveyed in two rows. However, the photographic printing papers P may be conveyed in three rows or more.

Moreover, in the above-described embodiment, the cut photographic printing paper P is exposed. However, images may be continuously exposed onto an uncut elongated photographic printing paper P. In a case in which the images are continuously exposed onto the elongated photographic printing paper P, a cut mark is exposed between the images, and a sort mark is exposed between the orders. After development processing, the cut mark is read by an optical sensor and the photographic printing paper P may be cut.

As described hereinbefore, in the above-described photosensitive material exposure method, the column direction of the photosensitive material is the main scanning direction and the direction orthogonal to the column direction is the sub-scanning direction. Since the plurality of images are disposed in a row in the sub-scanning direction, there is no need to rearrange the image data before exposure, and the circuits which handle the image data can be simplified. Since the long edge direction of the photographic printing paper or the like is the main scanning direction, the exposure time can be reduced even if the scan-exposure system uses the display element whose response time is slow. In case of single row exposure, the exposure is effected only on the necessary row. Thus, the exposure time can be reduced.

The above-described photosensitive material exposure apparatus includes a photosensitive material supporting portion in which the plurality of photosensitive materials are disposed in a row; and the scan-exposure system in which the column direction of the photosensitive materials is the main scanning direction, the direction orthogonal to the column direction is the sub-scanning direction, and the images are subjected to scan-exposure onto the photosensitive materials which are disposed on the photosensitive material supporting portion. Since the plurality of images are disposed in a row in the sub-scanning direction, there is no need to rearrange the image data before exposure, and the circuits which handle the image data can be simplified. Since the long edge direction of the photographic printing paper or the like is the main scanning direction, the exposure time can be reduced even if the scan-exposure system uses the display element whose response time is slow. In case of single row exposure, the exposure is effected only on the necessary row. Thus, the exposure time can be reduced.

Moreover, in the above-described photosensitive material exposure apparatus, because the scan-exposure system includes main scanning means which effects exposure of one line of the image and moving means which moves the main scanning means in the sub-scanning direction, the photosensitive material can be exposed in a stationary state. As a result, compared to the apparatus in which the photosensitive material is exposed while being moved, accurate sub-scanning can be performed and blur or the like in the image is prevented.

What is claimed is:

1. A photosensitive material scan-exposure method comprising the steps of:
    transporting horizontally, a plurality of photosensitive materials to an exposure area;
    forming images on the photosensitive materials by a single scan-exposure system when transportation of said photosensitive materials is stopped;
    wherein a column direction is a lengthwise direction on each of the plurality of photosensitive materials, said column direction being a main scanning direction, and said main scanning direction is a transporting direction of the plurality of photosensitive materials, and a direction orthogonal to the column direction is a sub-scanning direction.

2. A photosensitive material scan-exposure method according to claim 1, further comprising the step of reflecting a laser beam on a polygon mirror and rotating the polygon mirror to effect the main scanning.

3. A photosensitive material scan-exposure method according to claim 1, further comprising the step of linearly moving the scan-exposure system in the sub-scanning direction to effect the sub-scanning.

4. A photosensitive material scan-exposure method according to claim 2, further comprising the step of linearly moving the scan-exposure system in the sub-scanning direction to effect the sub-scanning.

5. A photosensitive material scan-exposure method according to claim 3, further comprising the step of driving a stepping motor to effect the linear movement.

6. A photosensitive material scan-exposure method according to claim 4, further comprising the step of driving a stepping motor to effect the linear movement.

7. A photosensitive material scan-exposure apparatus, comprising:
    a transporting mechanism for transporting a plurality of photosensitive materials;
    a photosensitive material supporting portion which horizontally supports the plurality of photosensitive materials; and
    a scan-exposure means for performing scan exposure of the photosensitive materials with a lengthwise direction of the photosensitive materials being a column direction of the photosensitive materials, and said column direction being a main scanning direction which is a transporting direction of the photosensitive materials, with a direction orthogonal to the column direction being a sub-scanning direction, wherein images are subjected to main scan-exposure onto the photosensitive materials which are disposed on said photosensitive material supporting portion.

8. A photosensitive material exposure apparatus according to claim 7, wherein said scan-exposure system includes main scanning means, which effects exposure of one line of the image, and sub-scanning means, which moves said main scanning means in the sub-scanning direction.

9. A photosensitive material exposure apparatus according to claim 8, wherein said main scanning means includes a polygon mirror which rotates so as to reflect a incident laser beam in the main scanning direction.

10. A photosensitive material scan-exposure apparatus, comprising:
    a transporting mechanism for transporting a plurality of photosensitive materials;

a photosensitive material supporting portion which horizontally supports the plurality of photosensitive materials; and a scan-exposure means for performing scan exposure of the photosensitive materials with a lengthwise direction of the photosensitive materials being a column direction of the photosensitive materials, and said column direction being a main scanning direction which is a transporting direction of the photosensitive materials, with a direction orthogonal to the column direction being a sub-scanning direction, wherein images are subjected to main scan-exposure onto the photosensitive materials which are disposed on said photosensitive material supporting portion;

wherein said main scanning means includes a polygon mirror which rotates so as to reflect an incident laser beam in the main scanning direction; and wherein said sub-scanning means includes moving means, which moves said main scanning means, and guide means, which guides said main scanning means linearly at a time of movement of said main scanning means.

11. A photosensitive material exposure apparatus according to claim 10, wherein said moving means includes a stepping motor.

12. A photosensitive material exposure apparatus according to claim 7, wherein said photosensitive material supporting portion is connected to negative pressure generating means via communicating means.

13. A photosensitive material scan-exposure apparatus, comprising:

a transporting mechanism for transporting a plurality of photosensitive materials;

a photosensitive material supporting portion which horizontally supports the plurality of photosensitive materials; and a scan-exposure means for performing scan exposure of the photosensitive materials with a lengthwise direction of the photosensitive materials being a column direction of the photosensitive materials, and said column direction being a main scanning direction which is a transporting direction of the photosensitive materials, with a direction orthogonal to the column direction being a sub-scanning direction, wherein images are subjected to main scan-exposure onto the photosensitive materials which are disposed on said photosensitive material supporting portion;

wherein said photosensitive material supporting portion is connected to negative pressure generating means via communicating means; and wherein a plurality of hole portions, to which suction force is applied by said negative pressure generating means, are formed at said photosensitive material supporting portion.

14. A photosensitive material exposure apparatus, comprising:

transporting means for transporting a plurality of photosensitive materials;

a photosensitive material supporting portion which horizontally supports the plurality of photosensitive materials;

main scanning direction exposure means in which a column direction in a lengthwise direction of the photosensitive materials is a main scanning direction, said main scanning direction being a transporting direction of the photosensitive materials, said main scanning direction exposure means which carries out scan-exposure in the main scanning direction; and sub-scanning means in which a direction orthogonal to the column direction is a sub-scanning direction and which moves said main scanning direction exposure means in the sub-scanning direction.

15. A photosensitive material exposure apparatus according to claim 14, wherein said main scanning direction exposure means includes a polygon mirror which rotates so as to reflect incident laser beam in the main scanning direction.

16. A photosensitive material exposure apparatus, comprising:

transporting means for transporting a plurality of photosensitive materials;

a photosensitive material supporting portion which horizontally supports the plurality of photosensitive materials;

main scanning direction exposure means in which a column direction in a lengthwise direction of the photosensitive materials is a main scanning direction, said main scanning direction being a transporting direction of the photosensitive materials, said main scanning direction exposure means which carries out scan-exposure in the main scanning direction; and sub-scanning means in which a direction orthogonal to the column direction is a sub-scanning direction and which moves said main scanning direction exposure means in the sub-scanning direction;

wherein said sub-scanning means includes moving means, which moves said main scanning direction exposure means, and guide means, which linearly guides said main scanning direction exposure means at a time of movement of said main scanning direction exposure means.

17. A photosensitive material exposure apparatus according to claim 16, wherein said moving means includes a stepping motor.

18. A photosensitive material exposure apparatus according to claim 14, wherein said photosensitive material supporting portion is connected to negative pressure generating means via communicating means.

19. A photosensitive material exposure apparatus according to claim 18, wherein a plurality of hole portions, to which suction force is applied by said negative pressure generating means, are formed at said photosensitive material supporting portion.

20. A photosensitive material exposure apparatus, comprising:

transporting means for transporting a plurality of photosensitive materials;

a photosensitive material supporting portion which horizontally supports the plurality of photosensitive materials;

main scanning direction exposure means in which a column direction in a lengthwise direction of the photosensitive materials is a main scanning direction, said main scanning direction being a transporting direction of the photosensitive materials, said main scanning direction exposure means which carries out scan-exposure in the main scanning direction; and sub-scanning means in which a direction orthogonal to the column direction is a sub-scanning direction and which moves said main scanning direction exposure means in the sub-scanning direction;

wherein said photosensitive material supporting portion is connected to negative pressure generating means via communicating means, and a plurality of hole portions, to which suction force is applied by said negative pressure generating means, are formed at said photosensitive material supporting portion.

21. A photosensitive material scan-exposure method according to claim 1, wherein, during image formation, main scanning is performed on a single sheet of the photosensitive material in a main scanning direction.

22. A photosensitive material scan-exposure apparatus according to claim 7, wherein the scan-exposure system performs main scan-exposure on a single sheet of the photosensitive material in a main scanning direction.

23. A photosensitive material scan-exposure apparatus according to claim 14, wherein the main scan direction exposure means performs scan exposure on a single sheet of the photosensitive material.

24. A photosensitive material scan-exposure apparatus, comprising;

a transporting mechanism which transports a plurality of photosensitive materials;

a photosensitive material supporting portion which horizontally supports the plurality of photosensitive materials; and a scan-exposure system in which a lengthwise direction of the photosensitive materials is a column direction, and said column direction is a main scanning direction of the photosensitive materials, in which a direction orthogonal to the column direction is a sub-scanning direction, and wherein images are subjected to main scan-exposure onto the photosensitive materials which are disposed on said photosensitive material supporting portion;

wherein said scan-exposure system includes main scanning means, which effects exposure of one line of the image, and sub-scanning means, which moves said main scanning means in the sub-scanning direction; and wherein said sub-scanning means includes moving means, which moves said main scanning means, and guide means, which guides said main scanning means linearly at a time of movement of said main scanning means.

* * * * *